United States Patent [19]
Wang

[11] Patent Number: 5,334,105
[45] Date of Patent: Aug. 2, 1994

[54] VARIABLE SPEED MECHANISM

[76] Inventor: Fue-Jye Wang, No. 29-20, Dong-Tsuen Rd., Taiping, Taichung Hsien, Taiwan

[21] Appl. No.: 81,131

[22] Filed: Jun. 25, 1993

[51] Int. Cl.$^5$ .............................................. F16H 7/00
[52] U.S. Cl. .......................................... 474/69; 474/84
[58] Field of Search ................................ 474/69-72, 474/84-89

[56] References Cited

U.S. PATENT DOCUMENTS

| | | | |
|---|---|---|---|
| 3,728,905 | 4/1973 | Fell et al. | 474/87 X |
| 4,240,368 | 12/1980 | Adams | 474/86 X |
| 4,922,727 | 5/1990 | Viegas | 474/84 X |

Primary Examiner—Thuy M. Bui
Attorney, Agent, or Firm—Browdy and Neimark

[57] ABSTRACT

A variable speed mechanism comprises a constant speed transmission set, a variable speed transmission set, a sun gear set comprising a first sun gear and a second sun gear, a locating member, two planetary gear sets, and a power source. The first sun gear is actuated to rotate at a constant speed by the constant speed transmission set. The rotating speed of the second sun gear 32 can be altered by adjusting the variable speed transmission set so as to cause the rotation of a power output shaft of the speed changing mechanism to accelerate, decelerate, reduce to zero, or reverse.

3 Claims, 5 Drawing Sheets

VARIABLE SPEED MECHANISM

BACKGROUND OF THE INVENTION

The present invention relates generally to a transmission mechanism, and more particularly to a variable speed mechanism.

The change gear is a very important member of the transmission device of the manufacturing machinery by virtue of the fact that the speed changing mechanism is capable of causing the machinery to operate at an optimum speed as required, so as to improve the operating efficiency of the manufacturing machinery.

SUMMARY OF THE INVENTION

The primary objective of the present invention is to provide a variable speed mechanism, which is simple in structure and is capable of operating at a variety of speed ranges. In addition, such a variable speed mechanism capable of functioning in various ways that its operating speed can be freely and instantly changed, accelerated, decelerated, and reduced to zero.

According to the present invention, a variable speed mechanism includes:

a constant speed transmission set comprising a first revolving element mounted on a first shaft, a second revolving element plyoreo to a second shaft, and a first intermediate element for connecting said first revolving element and said second revolving element in such a manner that said first revolving element and said second revolving element rotate at a constant speed in the same direction;

a variable speed transmission set comprising a first member mounted on said first shafts, a second member mounted on said second shaft, a second intermediate element connecting said first, member and said second to member in such a manner that said first member and said second member rotate in the same direction and an adjusting device for adjusting a rotating speed at which said variable speed transmission set rotates:

a sun gear set comprising a first sun gear pivoted to said second shaft and fastened with said first timing element, and a second sun gear mounted on an outer end of said second shaft;

a locating member having one end provided with a cylindrical portion and having another end provided with a power output shaft, said cylindrical portion having an open end dimensioned to receive therein said sun gear set, said cylindrical portion being provided in a circumference thereof with at least one window of a predetermined shape and having a pivot mounted therein axially;

a planetary gear set corresponding in number to said window and pivoted respectively to said pivot of said window, said planetary gear set comprising a first planetary gear engaging said first sun gear, said planetary gear set; further comprising a second planetary gear fastened with said first planetary gear such that said second planetary gear meshes with, said second sun gear; and a power source to drive said first shaft or said second shaft.

The foregoing objective and features of the present invention can be more readily understood upon a thoughtful deliberation of the following detailed description of the present invention in conjunction with the accompanying drawings.

DETAILED DESCRIPTION OF THE INVENTION

Figure 1:
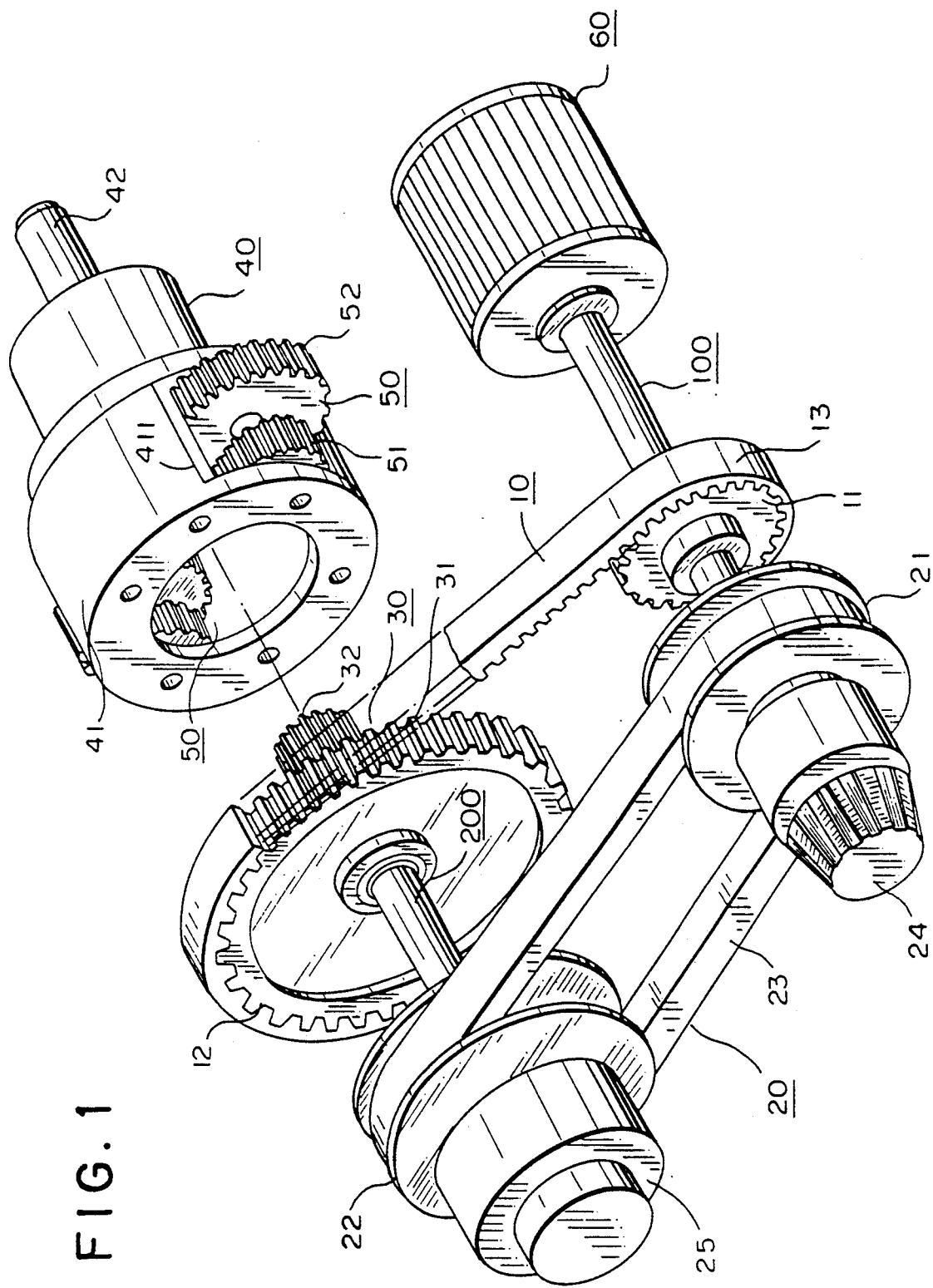
FIG. 1 shows a partial exploded view of the present invention.
Figure 2:
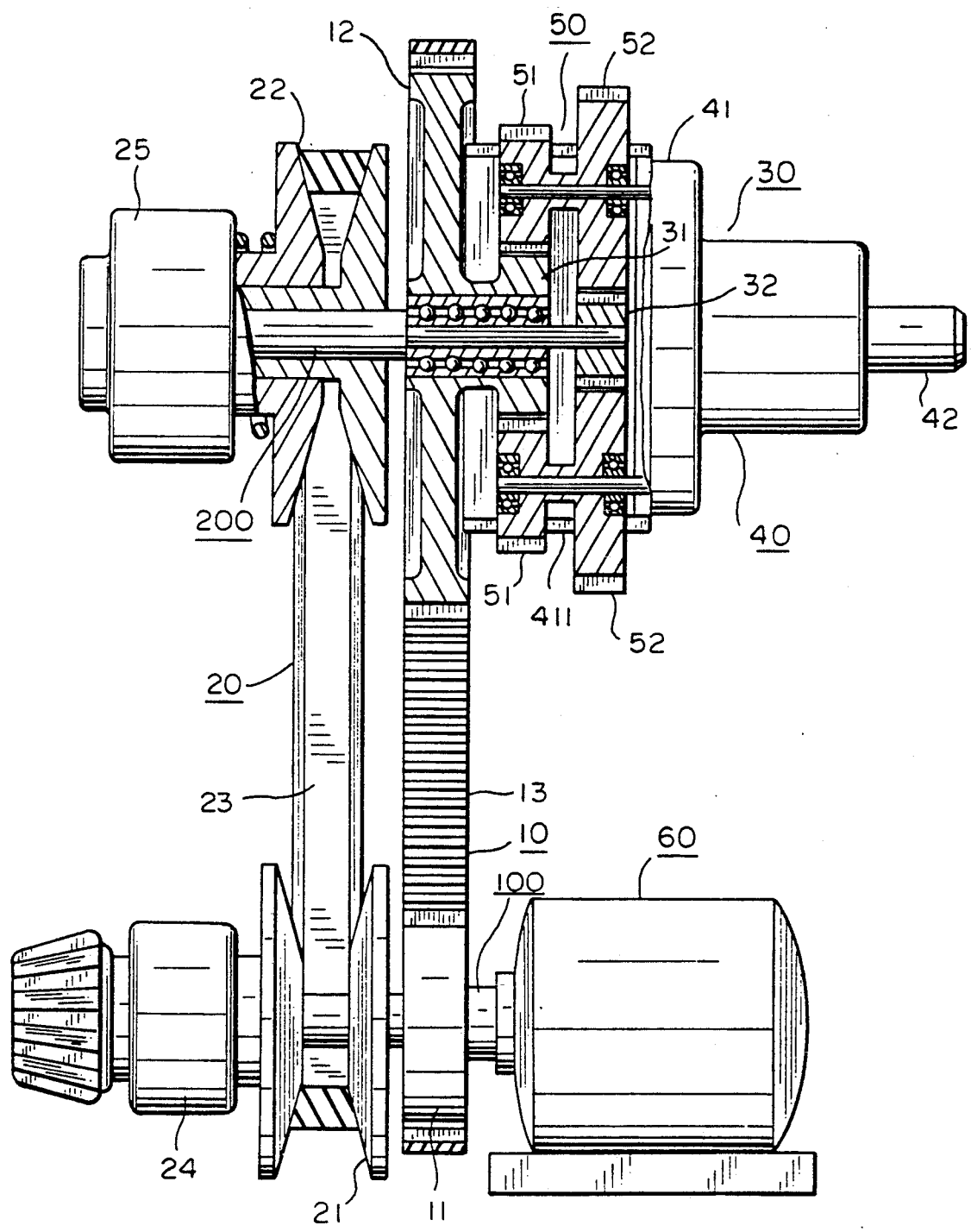
FIG. 2 shows a sectional view of the present invention in combination.

Referring now to FIGS. 1 and 2, the present invention is shown to comprise a constant speed transmission set 10, a variable speed transmission set 20, a sun gear set 30, a locating member 40, two planetary gear sets 50, and a power source 60.

The constant speed transmission set comprises a first revolving element being a first timing gear 11 which is mounted on a first shaft 100, a second revolving element using a second timing gear 12 which is pivoted to a second shaft 200, and a first intermediate element being a timing belt 13 having two ends which are fastened respectively to the first timing gear 11 and the second timing gear 12.

The variable speed transmission set 20 comprises a first member being a first variable speed belted wheel 21 which is mounted on the first shaft 100, a second member being a second variable speed belted wheel 22 which is mounted on the second shaft 200, a second intermediate element being an endless belt 23 having two ends which are fastened respectively to the wheel grooves of the first variable speed belted wheel 21 and the second variable speed belted wheel 22, and an adjusting member comprising an adjusting button 24 and a pressure adjusting member 25. The adjusting button 24 is attached to a side of the first variable speed belted wheel 21 for use in adjusting the pitch diameter of the wheel groove of the first variable speed belted wheel 21. The pressure adjusting member 25 is attached to a side of the second variable belted wheel 22 for use in correcting and adjusting the pitch diameter of the second variable speed belted wheel 22.

The sun gear set 30 comprises a first sun gear 31 and a second sun gear 32. The first sun gear 31 is pivoted to the second shaft 200 and fastened, with the first time regulating gear 12. They can be made integrally. The second sun gear 32 is mounted on the outer end of the second shaft 200.

The locating member 40 has one end provided with a cylindrical portion 41 having an open end to receive therein the first and the second sun gears 31 and 32. The cylindrical portion 41 is provided on the circumference thereof with two windows 411 symmetrical to each other. Each of the two windows 411 contains a pivot 412 mounted therein axially. The locating member 40 has another end provided with a power output shaft 42 mounted thereto axially and outwardly.

The two planetary gear sets 50 are pivoted respectively to the pivots 412 mounted respectively in the windows 411 of the locating member 40. Each of the two planetary gear sets 50 comprises a first planetary gear 51 engaging the first sun gear 31, and a second planetary gear 52 which is fastened with the first planetary gear 51 and engages the second sun gear 32. In fact, the first and the second planetary gears 51 and 52 may be made integrally.

The power source of a motor 60 is mounted on an outer end of the first shaft 100 and is intended for use in driving the first shaft 100.

In operation, the motor 60 is started to drive the first shaft 100, which in turn actuates the first timing gear 11 and the first variable speed belted wheel 21 to turn. The first timing gear 11 actuates via the timing belt 13 the second timing gear 12 to rotate, Since the second timing gear 12 and the first sun gear 31 are fastened together, the first sun gear 31 can rotate along with the second timing gear 12, which is actuated by the first timing gear 11 to rotate. On the other hand, the first variable speed belted wheel 21 actuates the second variable speed belted wheel 22 to rotate via the belt 23, thereby causing the second shaft 200 to rotate. Since the second sun gear 32 is mounted on the second shaft 200, the second sun gear 32 can be caused to rotate along with the second shaft 200. The first and the second sun gears 31 and 32 actuate respectively the first planetary gear 51 and the second planetary gear 52 to turn. The first sun gear 31 is actuated by the constant speed transmission set 10. As a result, the rotating speed of the first sun gear 31 remains constant. Accordingly, the rotating speed of the second sun gear 32 can be changed by adjusting the variable speed transmission set 20, so as to cause the rotation of the power output shaft 42 to accelerate, decelerate, reduce to zero, or reverse.

As mentioned previously, the variable speed transmission set 20 can be adjusted. The adjustment of the variable speed transmission set 20 is accomplished by rotating the adjusting button 24 to cause a change in the pitch diameter of the wheel groove of the first variable speed variable speed belted wheel 21. As a result, the second variable speed belted wheel 22 is caused by an increase or a decrease in the tension of the belt 23 to be urged or released by the pressure adjusting member 25. Therefore, the first variable speed belted wheel 21 and the second variable speed belted wheel 22 can be adjusted synchronously so as to alter the rotating speed of the variable speed transmission set 20.

The working of the speed changing mechanism of the present invention is based on the fact that the maximum common rotation rate of the differential gear is the maximum output speed of the power output shaft 42.

The planetary gear 50 is in a self-rotating state at such time when the variable speed transmission set 20 is so adjusted as to cause the speed of the second planetary gear 52 to be synchronous with the pitch: diameter linear speed of the first planetary gear 51. As a result, the power output shaft 42 does not bring about a common rotation under such a circumstance as described above. In other words, the power output shaft 42 is in a stationary state or in a state of zero speed by choice.

Furthermore, if the linear speed of the second planetary gear 52 is greater than that of the first planetary gear 51, the common rotation rate is then in an inverse proportion, thereby causing the power output shaft 42 to be in an output state of reverse rotation. The differential speed is directly proportional to the speed of the reverse rotation.

Figure 3:
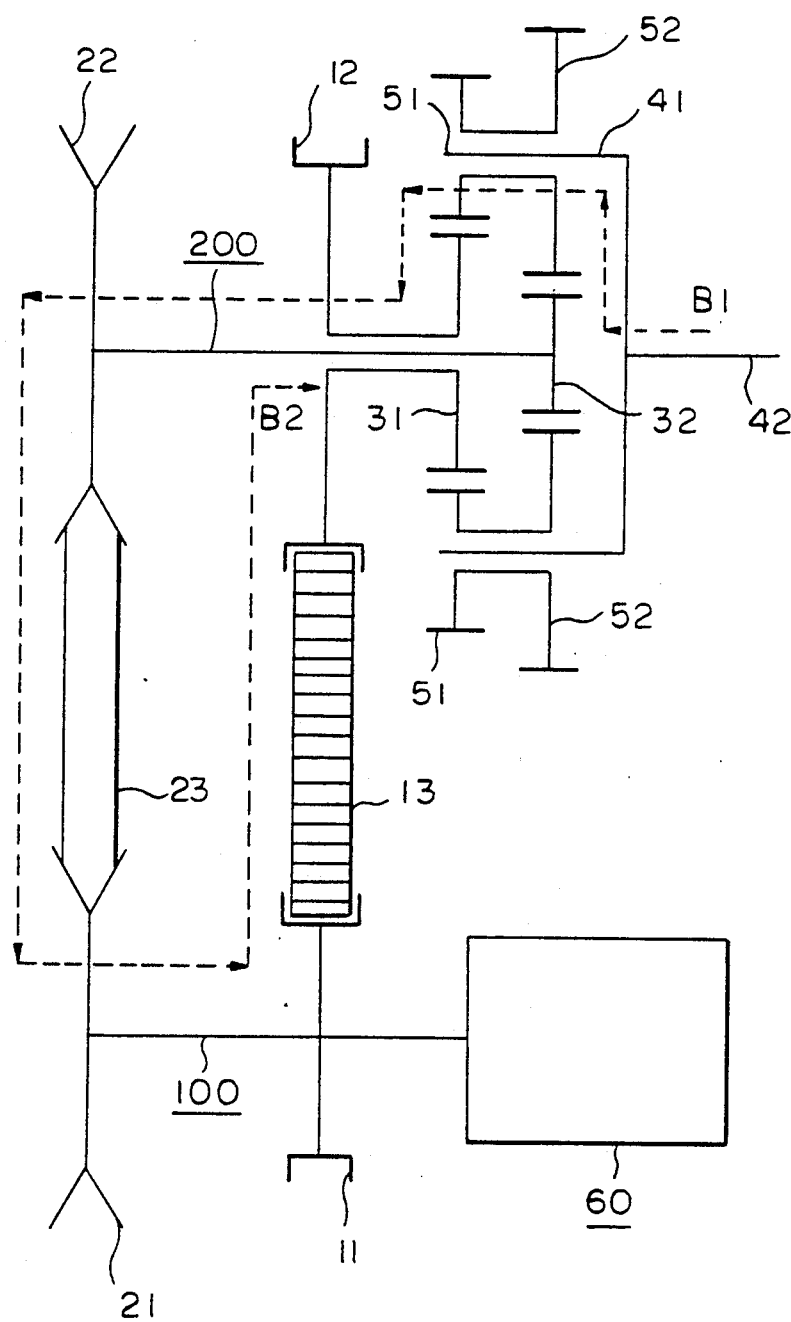
FIG. 3 shows a schematic view of the structure of the present invention.

In addition, when the power output shaft 42 is exerted upon by a moment of resistance, a speed differential of resistance is brought about by the normal rotational differential speed and the actual speed of the power output shaft 42. The speed differential of resistance drives the second planetary gear 52 to accelerate so as to impart the moment of force of the second planetary gear 52 to the variable speed transmission set 20 and then to the output via the constant speed transmission set 10, as shown by the dotted line B1-B2 in FIG. 3, until such time when the imparted moment of force is absorbed. This is the main feature of the present invention.

Figure 4:
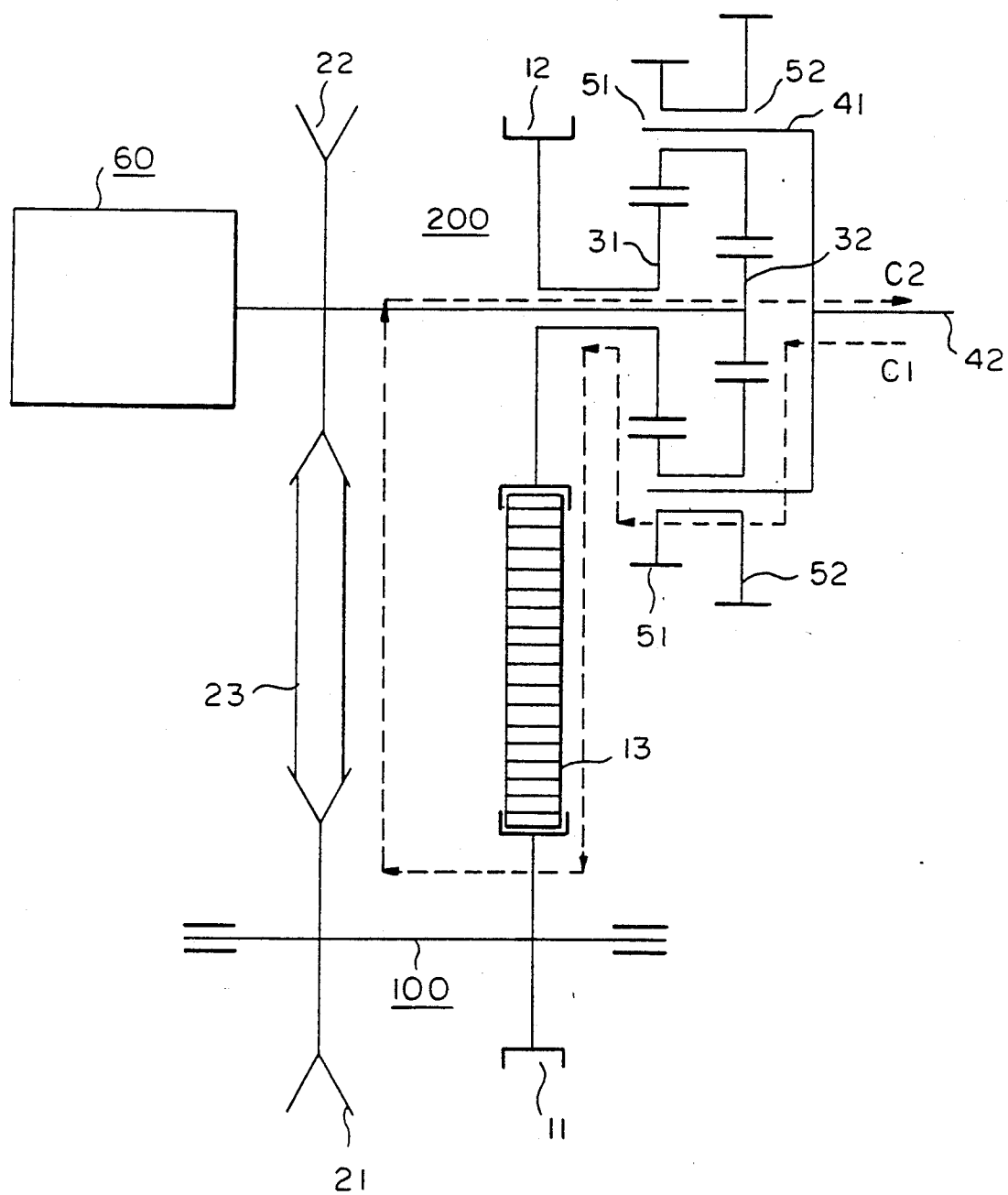
FIG. 4 is a schematic view showing that the power source is disposed on the second shaft, according to the present invention.

As shown in FIG. 4, the motor 60 is mounted on the outer end of the second shaft 200 so as to drive directly the second sun gear 32. The variable speed transmission set 20 and the constant speed transmission set 10 are responsible for the differential speed adjustment and the transmission of the imparted moment of force, which is brought about at such time when the power output shaft 42 is exerted on by the moment of resistance. The pathway of the transmission of the imparted moment of force is shown by a dotted line C1-C2 in FIG. 4. As a result, the load of the belt 23 is so reduced as to prolong the service span of the belt 23.

Figure 5:
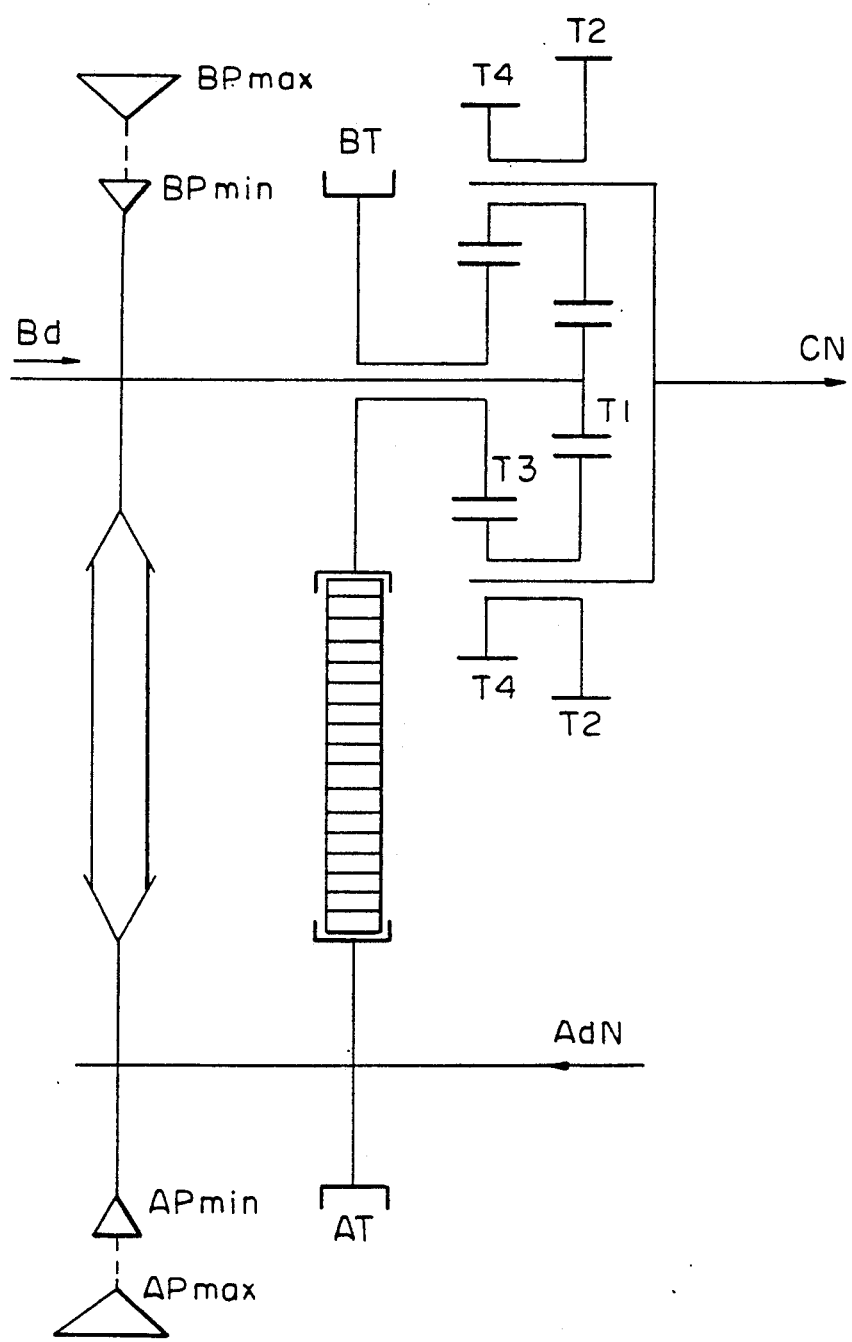
FIG. 5 is an auxiliary diagram illustrating the calculation of the power output shaft of the present invention.

The output speed variation of the present invention is expounded hereinafter by means of an embodiment in conjunction with FIG. 5.

Assuming that:

CN stands for the rotational speed of the power output shaft 42;

T stands for the number of teeth:

N stands for the rotational speed (rpm);

N1 stands for the rotational speed of the first sun gear 31;

N3 stands for the rotational speed of the second sun gear 32;

T1 stands for the number of teeth of the second sun gear 32 and equals 18T;

T2 stands for the number of teeth of the second planetary gear 52 and equals 24T×2;

T3 stand for the number of teeth of the first sun gear 31 and equals 24T;

T4 stands for the number of teeth of the first planetary gear 51 and equals 18T×2;

AT stands for the number of teeth of the first timing gear 11 and equals 18T;

BT stands for the number of teeth of the second timing gear 12 and equals 22T;

Ap max stands for the maximum pitch diameter of the first variable speed belted wheel 21 and equals 85;

Ap min stands for the minimum pitch diameter of the first variable speed belted wheel 21 and equals 34.5;

Bp max stands for the maximum pitch diameter of the second variable speed belted wheel 22 and equals 117;

Bp min stands for the minimum pitch diameter of the second variable speed belted wheel 22 and equals 58;

A dn stands for the rotational speed of the motor shaft and equals 1720 rpm; and B d stands for the second shaft 200.

$$CN = N3\left(1 + \frac{T3 \times T2}{T1 \times T4}\right) - N1\left(1 + \frac{T1 \times T4}{T2 \times T3}\right) \quad \text{equation 1:}$$

$$N3 = Adn \times \frac{AT}{BT} \quad \text{equation 2:}$$

$$N1 = Adn \times \frac{Apmax}{Bpmin}, \quad \text{equation 3:}$$

for use in computing the

-continued
deceleration, zero speed and self-rotation of the power output shaft.

$$N1 = Adn \times \frac{Apmin}{Bpmax}, \quad \text{equation 4:}$$

for use in computing the acceleration of the power output shaft (1) The following computations show an attainment of the maximum speed.

$$N3 = 1720 \times \frac{18}{22} = 1407.3 \text{ (rpm)}$$

$$N3\left(1 + \frac{T3 \times T2}{T1 \times T4}\right) = 1407.3 \times \left(1 + \frac{24 \times 24}{18 \times 18}\right) =$$

$$3908 \text{ (rpm)}$$

The differential motion is the smallest at the time when the maximum speed output is brought about.

As a result, the above equation 4 applies.

$$N1 = 1720 \times \frac{34.5}{117} = 507.18 \text{ (rpm)}$$

applying the second half of the equation 1:

$$N1\left(1 + \frac{T1 \times T4}{T2 \times T3}\right) = 507.18 \times \left(1 + \frac{18 \times 18}{24 \times 24}\right) =$$

$$792.46 \text{ rpm}$$

wherefore, CN=3908−792.46≈3115.5(rpm)

(2) The following computations show an attainment of the minimum speed. That is to say that the rotational speed output of the power output shaft 42 is 3115.5 (rpm), which is about double the rotational speed of the motor 60. This is to illustrate the effect of the acceleration of the present invention.

The rotational speed of the power output shaft 42 is inversely proportional to the differential motion. Therefore, the above equation 3 and equation 1 apply.

$$N1 = 1720 \times \frac{85}{58} = 2520.68 \text{ (rpm)}$$

$$CN =$$

$$1407.3 \times \left(1 + \frac{24 \times 24}{18 \times 18}\right) - 2520.68 \times \left(1 + \frac{18 \times 18}{24 \times 24}\right) \approx$$

$$3908 - 3938 \approx -30 \text{ (rpm)}$$

This means that the power output shaft 42 is in a state of reverse rotation.

In the embodiment described above, the constant speed transmission set is a timing gear while the variable speed transmission set is a belted wheel. In fact, two sprockets and one chain can be used as a constant speed transmission set. In addition, one driving gear, one driven gear and an idle gear may be also used in combination as a constant speed transmission set.

While the invention has been described in connection what is presently considered to be the most practical and preferred embodiments, it is to be understood that the invention is not to be limited to the disclosed embodiments but on the contrary, is intended to cover various modifications and equivalent arrangements included within the spirit and scope the appended claims which scope is to be accorded the broadest interpretation so as to encompass all such modifications and equivalent structures.

What is claimed is:

1. A variable speed mechanism comprising:
   a timing transmission set comprising a first element mounted on a first shaft, a second timing element pivoted to a second shaft, and an endless fastening element encircling said first timing element and said second timing element;
   a variable speed belted wheel set comprising a belted wheel mounted on said first shaft, a second belted wheel mounted on said second shaft, and an endless belt encircling a wheel groove of said first belted wheel and a wheel groove of said second belted wheel;
   a sun gear set comprising a first sun gear pivoted to said second shaft and fastened with said first timing element, and a second sun gear mounted on an outer end of said second shaft;
   a locating member having one end provided with a cylindrical portion and having another end provided with a power output shaft, said cylindrical portion having an open end dimensioned to receive therein said sun gear set, said cylindrical portion being provided in a circumference thereof with at least one window of a predetermined shape and having a pivot mounted there in axially;
   a planetary gear set corresponding in number to said window and pivoted respectively to said pivot of said window, said planetary gear set comprising a first planetary gear engaging said first sun gear, said planetary gear set further comprising a second planetary gear fastened with said first planetary gear such that said second planetary gear meshes with said second sun gear; and
   a power source to drive said first shaft of said second shaft.

2. A variable speed mechanism comprising:
   a timing transmission set of a timing gear type and comprising a first timing gear mounted on a first shaft, a second timing gear pivoted to a second shaft, and a timing belt encircling said first timing gear and said second timing gear;
   a variable speed belted wheel set comprising a first variable speed belted wheel mounted on said first shaft, a second variable speed belted belted wheel mounted on said second shaft, an endless belt encircling respectively a wheel groove of said first variable speed belted wheel and a wheel groove of said second variable speed belted wheel, a pressure adjusting button attached to one side of said first variable speed belted wheel for altering a pitch diameter of said wheel groove of said first variable speed belted wheel, and a compression spring mount disposed on a side of said second variable speed belted wheel for adjusting a pitch diameter of belted wheel groove of said second variable speed belted wheel;
   a sun gear set comprising a first sun gear pivoted said second shaft and fastened with said first timing gear, and a second sun gear mounted on an outer end of said second shaft;
   a locating member having one end provided with a cylindrical portion and having another end provided with a power output shaft, said cylindrical portion having an open end dimensioned to receive therein said first sun gear and said second sun gear, said cylindrical portion being provided in a circumference thereof with two sets or more of windows spaced at an interval, each of said windows having a pivot mounted therein axially;

two sets or more of planetary gear, each of which is pivoted to said pivot of each of said windows and composed of a first, planetary gear engaging said first sun gear and of a second planetary gear fastened with said first planetary gear such that said second planetary gear meshes with said second sun gear; and a power source mounted on an outer end of said first shaft or on an outer end of said second shaft.

3. A variable speed mechanism comprising:

a constant speed transmission set comprising a first revolving element mounted on a first shaft, a second revolving element pivoted to a second shaft, and a first intermediate element for connecting said first revolving element and said second revolving element in such a manner that said first revolving element and said second revolving element rotate at a constant speed in the same direction;

a variable speed transmission set comprising a first member mounted on said first shaft, a second member mounted on said second shaft, a second intermediate element connecting said first member and said second member in such a manner that said first member and said second member rotate in the same direction, and an adjusting device for adjusting a rotating speed at which said variable speed transmission set; rotates;

a sun gear set comprising a first sun gear pivoted to said second shaft and fastened with said first time-regulating element, and a second sun gear mounted on an outer end of said second a locating member having one end provided with a cylindrical portion and having another end provided with a power output shaft, said cylindrical portion having an open end dimensioned to receive therein said sun gear set, said cylindrical portion being provided in a circumference thereof with at least one window of a predetermined shape and having a pivot mounted therein axially;

a planetary gear set corresponding in number to said window and pivoted respectively to said pivot of said window, said planetary gear set comprising a first planetary gear engaging said first sun gear, said planetary gear set further comprising a second planetary gear set fastened with said first planetary gear such that said second planetary gear meshes with said second sun gear; and a power source to drive said first shaft or said second shaft.

* * * * *